United States Patent
Ko et al.

(10) Patent No.: US 9,567,965 B2
(45) Date of Patent: Feb. 14, 2017

(54) INTELLIGENT IDLE STOP AND GO CONTROL DEVICE AND METHOD THEREOF

(71) Applicant: Sung-suk Ko, Bucheon-si (KR)

(72) Inventors: Sung-suk Ko, Bucheon-si (KR); Kyu-man Hwang, Kwangmyung-si (KR)

(73) Assignee: Sung-Suk Ko, Bucheon (KR)

( * ) Notice: Subject to any disclaimer, the term of this patent is extended or adjusted under 35 U.S.C. 154(b) by 7 days.

(21) Appl. No.: 14/694,274

(22) Filed: Apr. 23, 2015

(65) Prior Publication Data

US 2015/0361910 A1    Dec. 17, 2015

(30) Foreign Application Priority Data

Jun. 11, 2014 (KR) .................. 10-2014-0071034

(51) Int. Cl.
*F02N 11/08* (2006.01)

(52) U.S. Cl.
CPC ....... *F02N 11/0818* (2013.01); *F02N 11/0822* (2013.01); *F02N 11/0833* (2013.01); *F02D 2200/1012* (2013.01); *F02N 2200/022* (2013.01); *F02N 2200/023* (2013.01); *F02N 2200/061* (2013.01); *F02N 2200/0801* (2013.01); *F02N 2200/0802* (2013.01); *F02N 2200/0808* (2013.01); *F02N 2200/101* (2013.01); *F02N 2200/102* (2013.01); *F02N 2300/2011* (2013.01); *Y02T 10/48* (2013.01); *Y10T 477/675* (2015.01); *Y10T 477/81* (2015.01); *Y10T 477/817* (2015.01)

(58) Field of Classification Search
None
See application file for complete search history.

(56) References Cited

U.S. PATENT DOCUMENTS 7,906,864 B2    3/2011    Ko
8,112,203 B2    2/2012    Shin et al.
(Continued)

FOREIGN PATENT DOCUMENTS

KR    10-2009-0006927 A    1/2009
KR    10-2009-0107359 A    10/2009
(Continued)

OTHER PUBLICATIONS

Korean Office Action issued on Jul. 17, 2015, in counterpart Korean Application No. 10-2014-0071034 (8 pages, in Korean).

*Primary Examiner* — Justin Holmes
(74) *Attorney, Agent, or Firm* — STIP Law Group, LLC (57) ABSTRACT

An intelligent ISG control device of a vehicle includes a signal detection unit configured to detect a plurality of signals of including a signal indicating a voltage or a state of charge of a battery, a signal indicating an engine RPM, a signal indicating a coolant temperature, a signal indicating an engine oil temperature of an engine, a signal indicating a vehicle speed, a signal indicating a phase or variation in phase of an accelerator pedal, a signal indicating manipulation of a brake pedal, a signal indicating a steering angle or operation of a power steering, and a signal indicating a brake booster pressure, and an ISG control unit configured to determine whether an engine stop condition or an engine stop release condition is satisfied based on at least one signal of the plurality of signals.

20 Claims, 6 Drawing Sheets

(56) References Cited

U.S. PATENT DOCUMENTS

| | | | | |
|---|---|---|---|---|
| 2002/0074173 | A1* | 6/2002 | Morimoto | B60K 6/485 |
| | | | | 180/65.26 |
| 2004/0221828 | A1* | 11/2004 | Ries-Mueller | F02N 11/0844 |
| | | | | 123/179.3 |
| 2006/0157023 | A1* | 7/2006 | Matsuki | B60K 25/02 |
| | | | | 123/339.16 |
| 2007/0199533 | A1* | 8/2007 | Takahashi | F02D 17/04 |
| | | | | 123/179.4 |
| 2013/0317728 | A1* | 11/2013 | Hall | B60H 1/00778 |
| | | | | 701/113 |
| 2015/0075491 | A1* | 3/2015 | Yoo | F02M 3/08 |
| | | | | 123/339.12 |
| 2015/0175149 | A1* | 6/2015 | Zhao | B60W 20/00 |
| | | | | 701/22 |
| 2015/0285202 | A1* | 10/2015 | Spohn | F02D 17/04 |
| | | | | 123/332 |

FOREIGN PATENT DOCUMENTS

| | | |
|---|---|---|
| KR | 10-2012-0059954 A | 6/2012 |
| KR | 10-2012-0060108 A | 6/2012 |
| KR | 10-1295044 B1 | 8/2013 |

* cited by examiner

INTELLIGENT IDLE STOP AND GO CONTROL DEVICE AND METHOD THEREOF

RELATED APPLICATION

This application claims the benefit of Korean Patent Application No. 10-2014-0071034, filed on Jun. 11, 2014, in the Korean Intellectual Property Office, the disclosure of which is incorporated herein in its entirety by reference.

BACKGROUND

1. Field

One or more example embodiments relate to an engine control device and a method thereof, and more particularly, to an intelligent idle stop and go (ISG) control device and a method thereof, which may save fuel consumption and conserve the environment.

2. Description of the Related Art

In order to increase fuel efficiency and reduce exhaust gas emission, an idle stop and go (ISG) system is widely used for vehicles with a 12V system.

In case where the vehicle is stationary, an ISG system automatically shuts down the engine when conditions for an ISG function are satisfied. Such an ISG system serves to improve fuel efficiency and reduce harmful gas emissions in vehicles.

However, an ISG system in the related art has limitations in improving fuel efficiency and reducing harmful gas emissions because the ISG system shuts down and restarts the engine only when the vehicle is stationary and thus the ISG system does not have a lot of opportunities to be applied in real driving conditions and also does not operate in linkage with a deceleration section.

SUMMARY

One or more example embodiments include an intelligent ISG control device and a control method thereof, in which an engine control unit (ECU) acquires a signal from a senor of a vehicle and blocks a fuel in a vehicle stop state or a vehicle deceleration state when a predetermined condition is achieved to enhance to enhance fuel efficiency of the vehicle and reduce harmful gas emissions.

Additional aspects will be set forth in part in the description which follows and, in part, will be apparent from the description, or may be learned by practice of the presented example embodiments.

According to one or more example embodiments, an intelligent idle stop and go (ISG) control device for a vehicle includes a signal detection unit configured to detect a plurality of signals including a signal indicating a voltage or a state of charge of a battery of the vehicle, a signal indicating an engine revolution per minute (RPM) of the vehicle, a signal indicating a coolant temperature of the vehicle, a signal indicating a vehicle speed of the vehicle, a signal indicating a phase or a variation in phase of an accelerator pedal of the vehicle, a signal indicating adjustment of a brake pedal of the vehicle, a signal indicating a steering angle or actuation of a power steering of the vehicle, and a signal indicating a brake booster pressure of the vehicle; and an ISG control unit configured to determine whether an engine stop condition of the vehicle is satisfied and whether an engine stop release condition of the vehicle is satisfied based on at least one signal of the plurality of signals detected by the signal detection unit, wherein the ISG control unit turns off an injector of an engine to stop the engine when the engine stop condition is satisfied.

According to one or more example embodiments, an intelligent idle stop and go (ISG) control device for a vehicle includes a signal detection unit configured to detect a plurality of signals including a signal indicating a voltage or a state of charge of a battery of the vehicle, a signal indicating an engine revolution per minute (RPM) of the vehicle, a signal indicating a coolant temperature of the vehicle, a signal indicating an engine oil temperature of an engine of the vehicle, a signal indicating a vehicle speed of the vehicle, a signal indicating a phase or a variation in phase of an accelerator pedal of the vehicle, a signal indicating manipulation of a brake pedal of the vehicle, a signal indicating a steering angle or actuation of a power steering of the vehicle, and a signal indicating a brake booster pressure of the vehicle; and an ISG control unit configured to determine whether an engine stop condition of the vehicle is satisfied based on at least one of the plurality of signals detected by the signal detection unit, wherein the ISG control unit turns off an injector of an engine to stop the engine when the engine stop condition is satisfied.

The signal detection unit may be further configured to detect a signal indicating an engine oil temperature of the engine of the vehicle, and the ISG control unit may be configured to determine the engine stop condition based on the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed.

The ISG control unit may be configured to turn on the injector to release the engine stop when at least one of the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed does not satisfy the engine stop condition.

The ISG control unit may not stop the engine when a predetermined first time (time 2 of FIG. 6) has not elapsed since the engine was restarted in a vehicle moving state although the engine stop condition is satisfied.

The ISG control unit may not stop the engine when a predetermined second time (time 1 of FIG. 6) has not elapsed since the engine was restarted in a vehicle stop state although the engine stop condition is satisfied.

The ISG control unit may not stop the engine when the vehicle speed has never been outside a predetermined range since the engine was restarted in a vehicle moving state although the engine stop condition is satisfied.

The ISG control unit may not stop the engine when the vehicle speed has not exceeded a predetermined first reference vehicle speed (constant 3 of FIG. 5) since the engine was restarted in a vehicle stop state although the engine stop condition is satisfied.

The vehicle may include an automatic transmission, and the ISG control unit may allow the engine stop to be initiated depending on whether or not the automatic transmission is locked up in a vehicle deceleration state.

The ISG control unit may determine whether the engine stop is initiated, in linkage with a fuel cut condition in a vehicle deceleration state.

The ISG control unit may turn off the injector of the engine until the engine stop release condition is satisfied, when the engine stop condition is satisfied although a fuel cut release condition is achieved in a vehicle deceleration state.

The ISG control unit may not stop the engine when an absolute value of a variation in deceleration of the vehicle speed of the vehicle is greater than a predetermined deceleration reference value.

The ISG control unit may allow the engine stop to be initiated only when a brake of the vehicle is on through manipulation of the brake pedal in a vehicle moving state.

The ISG control unit may not stop the engine when a predetermined third time (constant z of FIG. 3) has not elapsed with the entire engine stop condition being satisfied.

The ISG control unit may determine the engine stop condition and the engine stop release condition depending on whether or not an electronic power steering is applied to the vehicle, whether or not a power steering angle sensor or switch is applied to the vehicle, or whether or not a brake booster pressure sensor is applied to the vehicle.

The ISG control unit may determine whether the engine stop condition is achieved based on a required torque value generated based on a torque-based control of the engine instead of the signal indicating the phase or the variation of the phase of the accelerator pedal.

The ISG control unit may release the engine stop when the accelerator pedal is on (a pressed state) or the brake pedal is off (a released state) in a condition that the engine stop condition is satisfied to stop the engine.

According to one or more example embodiments, an intelligent idle stop and go (ISG) control method for a vehicle includes: detecting a plurality of signals including a signal indicating a voltage or a state of charge of a battery of the vehicle, a signal indicating an engine revolution per minute (RPM) of the vehicle, a signal indicating a coolant temperature of the vehicle, a signal indicating a vehicle speed of the vehicle, a signal indicating a phase of an accelerator pedal of the vehicle, a signal indicating manipulation of a brake pedal of the vehicle, a signal indicating a steering angle or actuation of a power steering of the vehicle, and a signal indicating a brake booster pressure of the vehicle; determining whether an engine stop condition or an engine stop release condition of the vehicle is satisfied based on at least one of the detected plurality of signals; and turning off an injector of an engine to stop the engine when the engine stop condition is satisfied.

The injector of the engine may be turned off until the engine stop release condition is satisfied once the engine stop is initiated although the fuel cut release condition is achieved in a vehicle deceleration state.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. Expressions such as "at least one of," when preceding a list of elements, modify the entire list of elements and do not modify the individual elements of the list.

Hereinafter, embodiments of the present invention will be described in detail with reference to FIGS. 1 to 6.

First, the term "ISG" used herein is written as an intelligent idle stop and go (ISG) in order to make a clear distinction with the idle stop and go (ISG) in the related art. In the ISG function in the related art, an idle state means a state where the vehicle speed is 0 and an accelerator pedal value calculated through internal conversion by an engine control unit (ECU) or a power control unit (PCU) is 0 although the engine is started up. On the contrary, an intelligent idle stop and go (ISG) according to an embodiment of the present invention determines an engine stop (fuel cut) condition even in a vehicle deceleration section and controls engine stop or engine restart depending on a result of the determination in order to further save fuel consumption.

Figure 1:
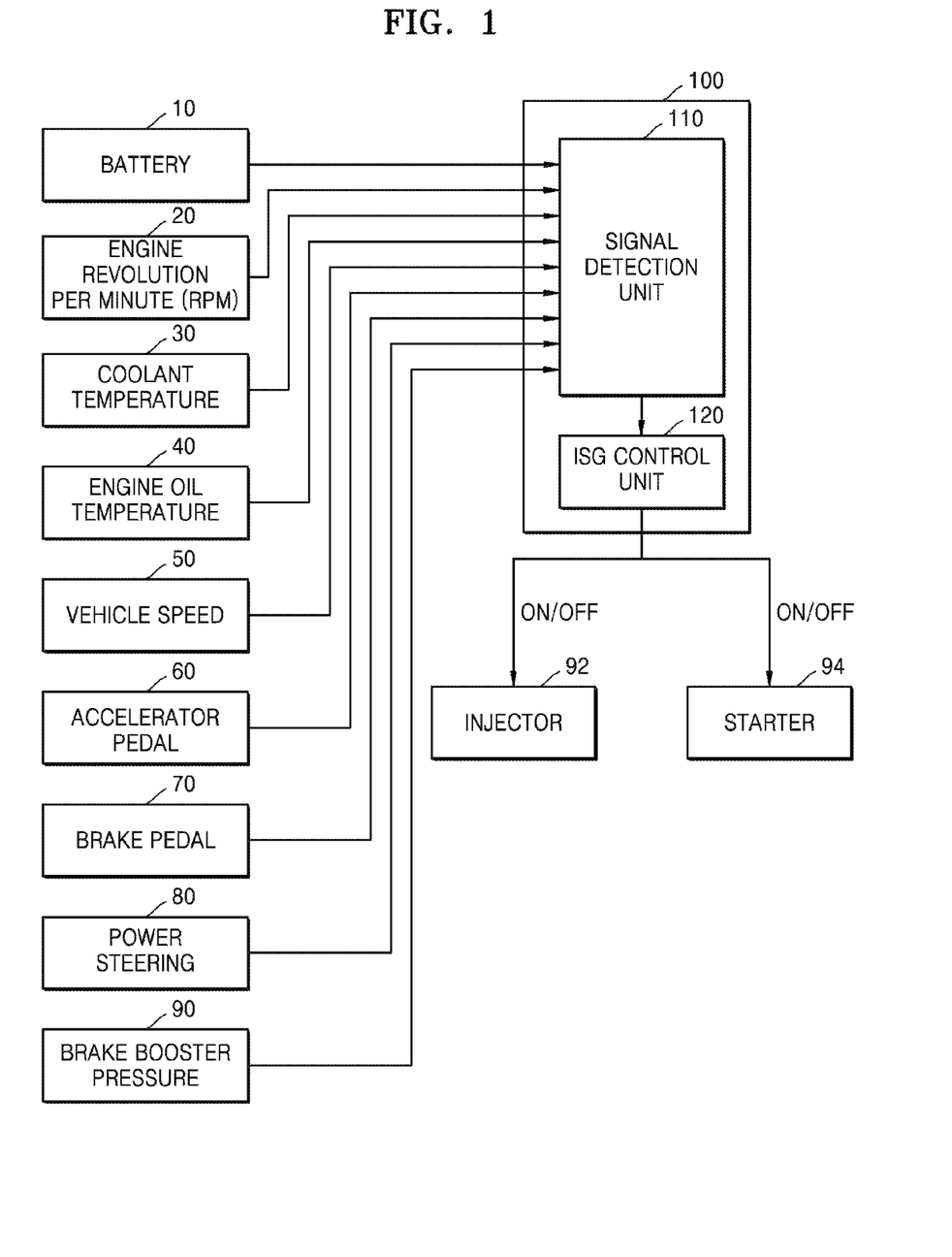
FIG. 1 is a block diagram illustrating an intelligent ISG control device according to an embodiment of the present invention.

Referring to FIG. 1, an intelligent ISG control device 100 of a vehicle according to an embodiment may enhance fuel efficiency by stopping an engine of the vehicle while the vehicle is decelerated or stopped. The intelligent ISG control device 100 includes a signal detection unit 110 and an ISG control unit 120.

The signal detection unit 110 detects a signal indicating a voltage or a state of charge of a battery of the vehicle, a signal indicating an engine revolution per minute (RPM) of the vehicle, a signal indicating a coolant temperature of the vehicle, a signal indicating an engine oil temperature of an engine of the vehicle, a signal indicating a vehicle speed of the vehicle, a signal indicating a phase of an accelerator pedal of the vehicle, a signal indicating manipulation of a brake pedal of the vehicle, a signal indicating a steering angle or actuation of a power steering of the vehicle, and a signal indicating a brake booster pressure of the vehicle.

More specifically, the signal detection unit 110 acquires relevant information such as a current voltage or state of charge from a battery 10 of the vehicle. In addition, the signal detection unit 110 is positioned in an ECU or PCU of the vehicle to acquire information regarding a current engine revolution per minute (RPM) 20 of the engine, information regarding a current coolant temperature 30 of the engine, and information regarding an engine oil temperature 40 of the engine. In addition, the signal detection unit 110 acquires a signal 50 regarding the vehicle speed information measured by a vehicle speed sensor installed in the vehicle from an ABS module through controller area network (CAN) communication or acquires the signal directly from the vehicle speed sensor. The signal detection unit 110 acquires a phase signal or a phase variation signal from an accelerator pedal 60, acquires a signal regarding whether a brake switch is currently on from the brake pedal 70, and acquires a signal indicating a brake booster pressure 90 from a pressure sensor or the like installed in a brake booster. Furthermore, the signal detection unit 110 acquires information regarding a signal indicating a steering angle or actuation of a power steering 80 from a sensor installed in the power steering 80 directly or through the CAN communication.

The ISG control unit 120 determines whether a condition for stopping an engine (hereinafter referred to as an engine stop condition) of a vehicle is satisfied on the basis of at least one of a plurality of signals that are input from the signal detection unit 110. When the engine stop condition to be described below is satisfied, the ISG control unit 120 turns off an injector 92 installed in the engine of the vehicle such that the engine of the vehicle is stopped. When a condition for releasing the stop of the vehicle (hereinafter referred to as an engine stop release condition) is satisfied, the ISG control unit 120 turns on the injector 92 to spray fuel and actuate a starter 94 of the engine such that the engine of the vehicle is restarted.

Figure 2:
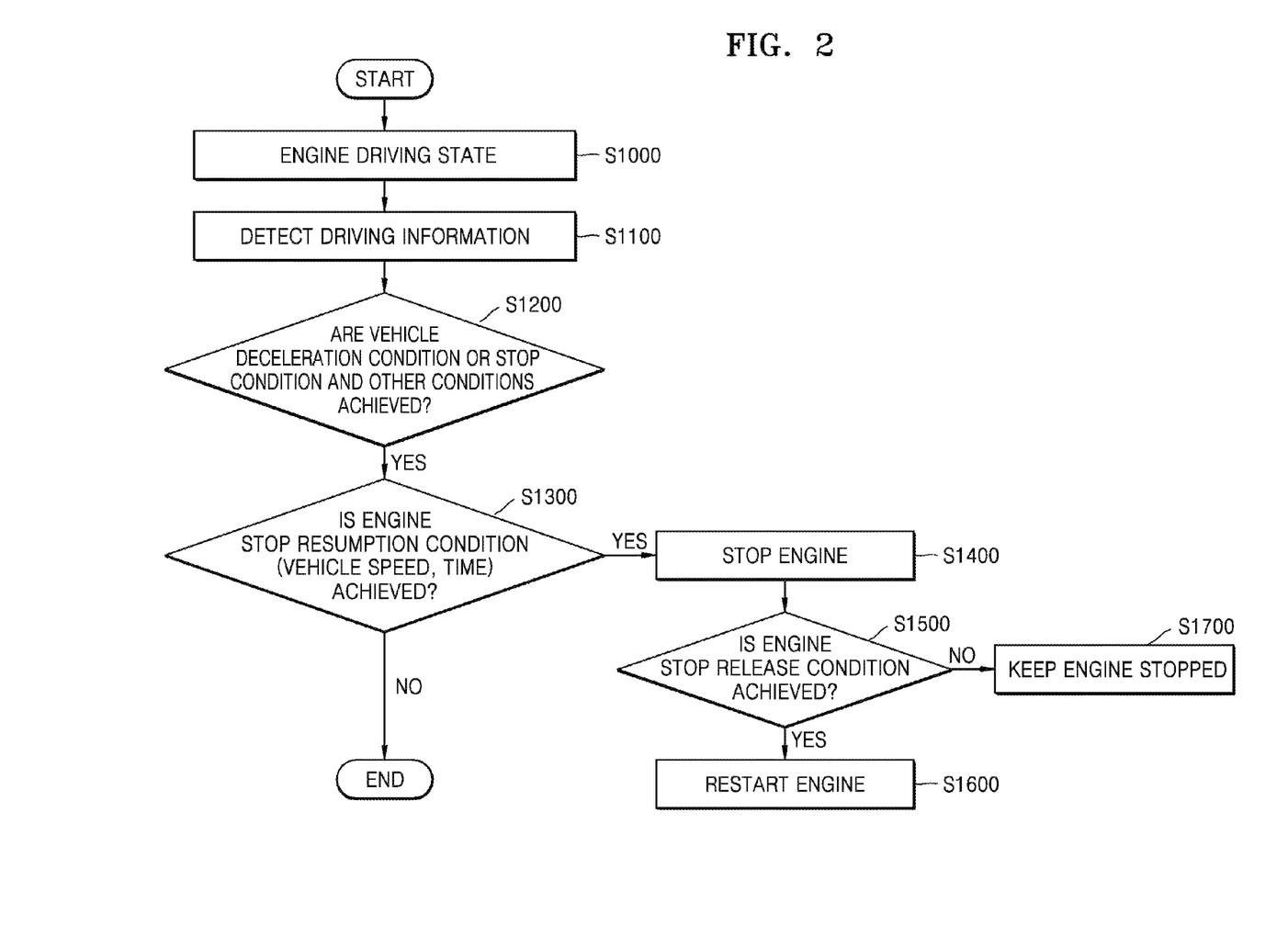
FIG. 2 is a view illustrating an intelligent ISG control method according to an embodiment of the present invention.

FIG. 2 is a view illustrating an overall flow of an intelligent ISG control method according to an embodiment. The intelligent ISG control method is carried out by the ISG control unit 120 of the above-described intelligent ISG control device 100.

The engine may be driving (S1000). The ECU uses information directly acquired from a plurality of sensors and information acquired from another module through the CAN communication (S1100) to determine whether the vehicle is decelerated or stopped (S1200) and to determine whether the engine stop condition is achieved (S1300). The engine stop condition includes a condition for allowing the engine to be stopped again (hereinafter referred to as an engine stop resumption condition) when an appropriate time and an appropriate vehicle speed are accomplished such that the engine is prevented from being frequently stopped and from being repeatedly restarted. The intelligent ISG control method includes stopping fuel spray to stop the engine when the engine stop condition is achieved (S1400), restarting the engine (S1600) when the engine stop release condition is achieved (S1500), and keeping the engine stopped when the engine stop release condition is not achieved (S1700).

An engine stop condition will be described in detail below with reference to FIG. 3. In the intelligent ISG control method according to an embodiment of the present invention, the engine stop condition is achieved when a plurality of conditions are all achieved.

When the vehicle is kept stopped during a sufficient time period (that is, an engine soaking time is long), an engine oil temperature and a coolant temperature become almost equal to room temperature. In this case, the engine stop is not allowed until a temperature of a catalyst installed in the vehicle increases to a sufficient degree (for example, 350 to 400). The reason is that there is an increased possibility that emission regulation requirements may not be met because a too large amount of exhaust gas emits due to a delay in warm-up of the vehicle catalyst. Accordingly, the engine oil temperature and the coolant temperature may be set in a condition that the engine and catalyst of the vehicle are normally warmed up. For example, for the engine coolant temperature, constant a may be set between 40 and 80, and constant a1 may be set between 105 and 115. For the engine oil temperature, constant b may be set between 40 and 80, and constant b1 may be set between 105 and 115 (S1201). The set values of constant a1 and constant b1 are intended to prevent overheating of the engine. When the engine coolant temperature and the engine oil temperature are greater than constant a1 and constant b1, respectively, the engine is not stopped but kept running to circulate the coolant, thereby preventing overheating of the engine. Meanwhile, when a value of one of the engine coolant temperature (constant a) and the engine oil temperature (constant b) is set to be extremely high, this is actually the same as a case where only one condition is used. For example, when constant b of the engine oil temperature is set to be 120 and constant a of the engine coolant temperature is set to be 60, this is actually the same as a case where only the engine coolant temperature is used as the condition.

A starter motor (an alternator serves as the starter when an alternator-motor is equipped) needs to be necessarily driven in order to drive the stopped engine. Driving performance of the starter motor may be determined according to a battery state of the vehicle. Therefore, an engine stop condition (S1200) may be set according to the battery charge state (S1202). For example, when a vehicle speed is greater than constant c (30 km/h to 70 km/h), an engine revolution per minute (RPM) is greater than constant d (1200 rpm to 2000 rpm), a battery voltage is equal to or greater than constant e (13.0V to 14.0V), or a state of charge (SOC, which is an index indicating a battery charge state) is greater than constant e1 (80% to 90%), the battery may be determined to be sufficient to restart the engine. Alternatively, if the battery voltage is greater than constant e2 (11V to 12V) or the state of charge (SOC) is greater than constant e3 (80% to 90%) when the engine was stopped in a vehicle stop state, a battery condition (S1202) of the engine stop condition (S1200) in an engine stop state is achieved. The reason why the condition is classified into an engine running state and an engine stop state is that a voltage generated by the alternator is equal to or greater than 14V under typical conditions when the engine is running, and a typical battery voltage is equal to or greater than 12V because the alternator is not actuated in the engine stop state when the vehicle is stopped. The battery condition is intended to secure a driving force of the starter motor for stopping or restarting the engine, and secure power steering performance when an electronic power steering is applied to the vehicle.

A vehicle with a fluid type power steering may have a critical problem for safety during slow down driving because the power steering oil pump installed in the engine is also stopped when the engine is stopped, thereby resulting in hard power steering. Accordingly, in an embodiment of the present invention, the intelligent ISG may be implemented under safe conditions by including a condition for a rotation angle of a steering column of the power steering in the engine stop condition.

In general, the rotation angle of the steering column of the power steering is determined using two-type methods. One is a method of using a sensor to measure what is a current rotation angle, and the other is a method of using a switch to simply determine whether the power steering is actuated. In a case in which the rotation angle of the steering column of the power steering may be measured, the engine stop condition (S1203) associated with the power steering may be achieved only when the rotation angle is less than constant f (5° to 30°). For the switch type, the engine stop condition (S1203) may be achieved only when the switch is off. Since there is another type power steering (for example, electronic power steering) in addition to the fluid type, the above-described condition may be modified appropriately depending on the power steering type, by using a calibration option bit. In addition, although an electronic power steering has been adopted by a manufacturer as its strategic choice, the above-described condition may be applied without modification in order to further promote safety.

A fuel-cut function that is being used in most vehicles is a technique applied for a case in which the speed is slowed down during high-speed driving. Accordingly, the existing fuel-cut function is used when the vehicle speed is equal to or greater than constant h (80 kph to 100 kph), and the vehicle speed condition (S1205) may be allowed to be achieved only when the vehicle speed is less than constant h. Thus, the ECU or PCU turns off the injector when one of the engine stop condition and the existing fuel-cut condition is achieved (that is, an OR condition) in a condition that the vehicle speed is less than constant h. Furthermore, in order to perform fuel-cut extension, which is proposed in a method according to an embodiment, the condition may be linked with the existing deceleration fuel-cut. When the condition may be linked with the existing deceleration fuel-cut (S1210), synchronization may be performed using a synchronization option bit (for example, the bit is set to be 1), which is a calibration parameter. In this case, although the fuel-cut release condition is achieved while the fuel-cut function is performed, an engine stop logic may continue to be driven to implement fuel-cut extension as long as the engine stop release condition (S1500) is not achieved. That is, when the deceleration fuel-cut condition is not achieved, the engine is not stopped in a vehicle moving state. In addition, when synchronization with the deceleration fuel-cut is not performed, the engine stop condition is achieved by only other conditions by setting a fuel-cut synchronization option bit to 0 to allow a fuel-cut synchronization condition to always have a value of true.

The intelligent ISG control method according to an embodiment of the present invention considers safety of the vehicle, and one of considerations is a brake booster pressure. The brake booster pressure indicates a brake performance that stops the vehicle according to a driver's intention. Accordingly, when the brake booster pressure is not sufficient, that is, the brake booster pressure is equal to or greater than constant I (40 kPa to 60 kPa of absolute pressure), the engine stop condition may not be achieved (S1206). In order to conserve the brake performance, a brake vacuum pump may not be integrated with an alternator but separately installed for most of diesel vehicles and some of gasoline vehicles, and a pressure air pump for brake may be used for heavy-duty commercial vehicles. In this case, the engine stop condition associated with the brake booster pressure condition (S1206) may be set to be always satisfied by setting a corresponding option bit to be 0. This condition may be applied even when a separate brake booster pump is installed by a manufacture as its strategic choice.

Meanwhile, the engine should not be stopped in a rapid deceleration situation for vehicle safety. That is, when the boost pressure is sufficient when the engine begins to be stopped, and then in a short time the booster pressure becomes insufficient, the booster pressure satisfies the release condition and thus the engine is restarted. However, the restart is too late, thus causing a dangerous situation. Accordingly, in an embodiment of the present invention, an engine stop condition based on a deceleration slope of the vehicle speed may be set. When an absolute value of the deceleration slope of the vehicle speed is equal to or greater than constant m (7 km/h/s to 15 km/h/s), this is an emergency situation and thus the engine stop condition is not allowed to be achieved (S1211).

A safety condition that is accompanied by the above-described conditions (S1206 and S1211) is a reliability condition for information that is acquired from a plurality of sensors in order to determine the engine stop condition (S1200). The engine stop condition is achieved only when all sensors used for the engine stop condition, such as a vehicle speed sensor, a crank sensor, a coolant temperature sensor, an engine oil sensor, a steering angle sensor (or switch), a brake sensor, an accelerator pedal sensor, a brake booster pressure sensor, and a battery sensor are in a normal state (S1212). The number of sensors may increase or decrease depending on a specification of the vehicle. For example, in order to check a battery state, the battery voltage may be used, and the battery sensor (for measuring SOC) may not be applied.

Figure 3:
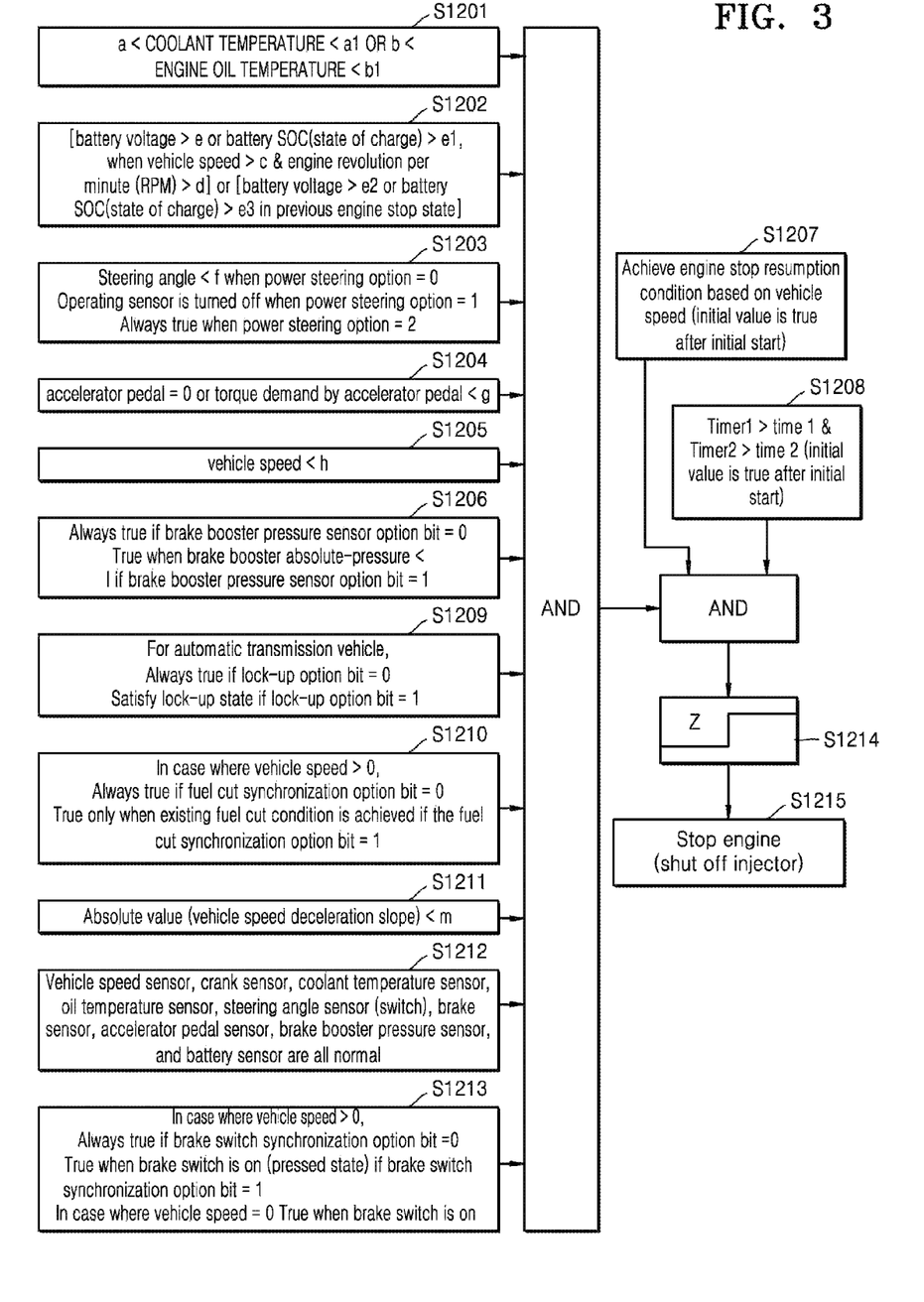
FIG. 3 is a view illustrating an engine stop condition in an intelligent ISG control method according to an embodiment of the present invention.

Next, a detailed description will be provided with reference to FIG. 3.

For an automatic transmission vehicle, a lock-up control is performed between an engine and a transmission (that is, a state in which an input spindle is locked up with an output spindle). In this case, the engine stop condition may be selectively achieved according to whether the engine and the transmission are locked up in a vehicle moving state. Alternatively, the engine stop condition may always be achieved by using a calibration lock-up option bit, irrespectively of the lock-up, and engine stop during driving may be initiated only in a lock-up state. Once the engine stop is initiated, the engine stop continues even when the lock-up is released as long as the engine stop release condition is not achieved. In this manner, the engine stop condition may be selectively applied according to whether to lock up the transmission during driving (S1209).

An accelerator pedal and a brake pedal are pedals that a driver most frequently use while driving his/her vehicle. The engine stop condition according to an embodiment of the present invention may be achieved using signals of the two pedals. For the accelerator pedal, an accelerator pedal condition (S1204) may be achieved with a torque value for each accelerator pedal opening degree (including 0% indicating a state in which the pedal is not pressed). In general, a brake torque value (constant g) when the accelerator pedal opening degree is 0% requires a negative value (−100 Nm to −5 Nm). The accelerator pedal opening or the required torque may be selectively applied according to the control method.

When a calibration brake pedal option bit is set to be 1, the engine stop condition (S1213) is achieved only when the brake pedal is pressed, irrespectively of whether the vehicle is moving or stopped. When the brake pedal option bit is set to be 0, a corresponding condition is a true value even when the brake is not pressed during driving.

Figure 5:
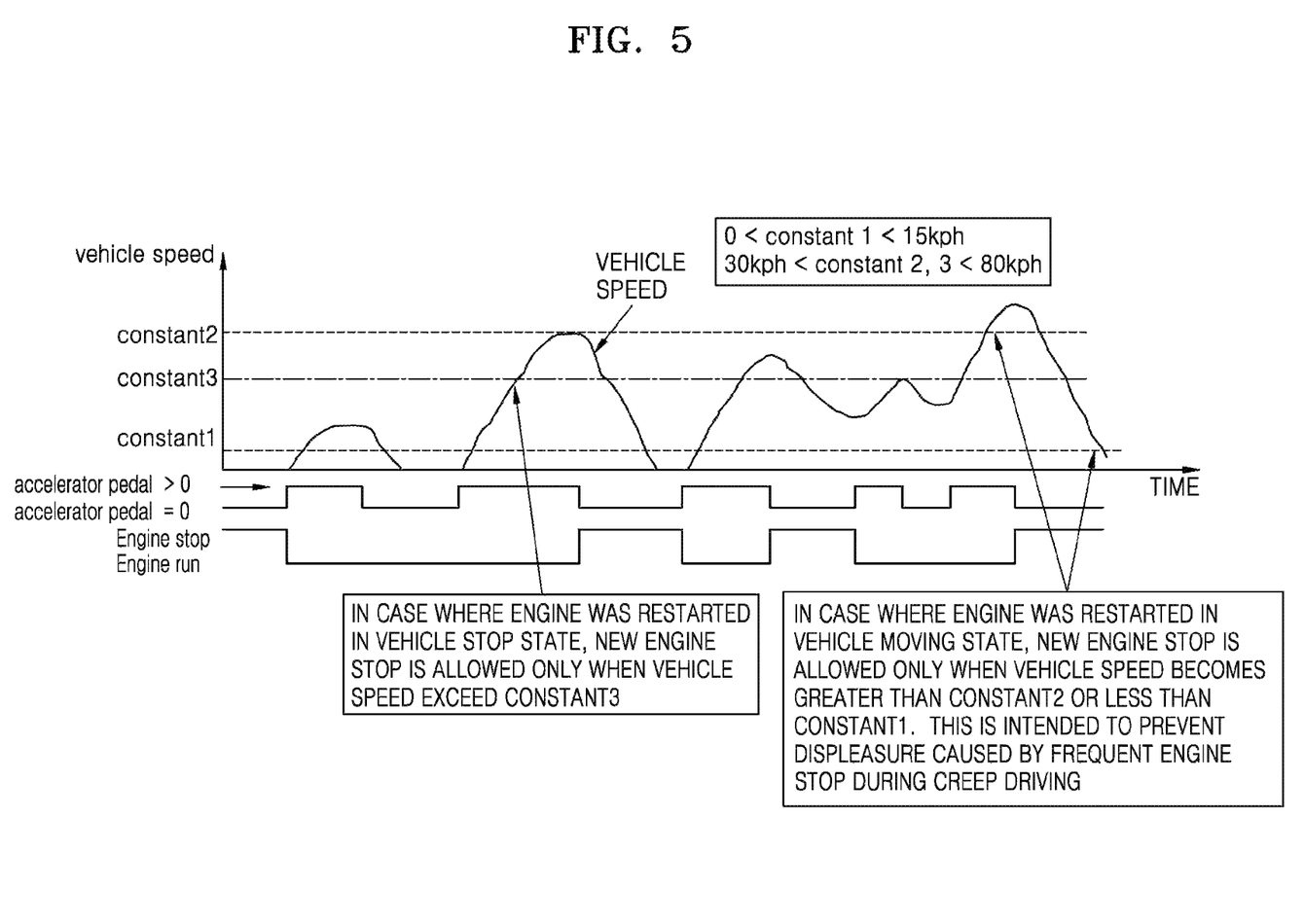
FIG. 5 is a view illustrating a vehicle speed condition among engine stop resumption conditions in an intelligent ISG control method according to an embodiment of the present invention.
Figure 6:
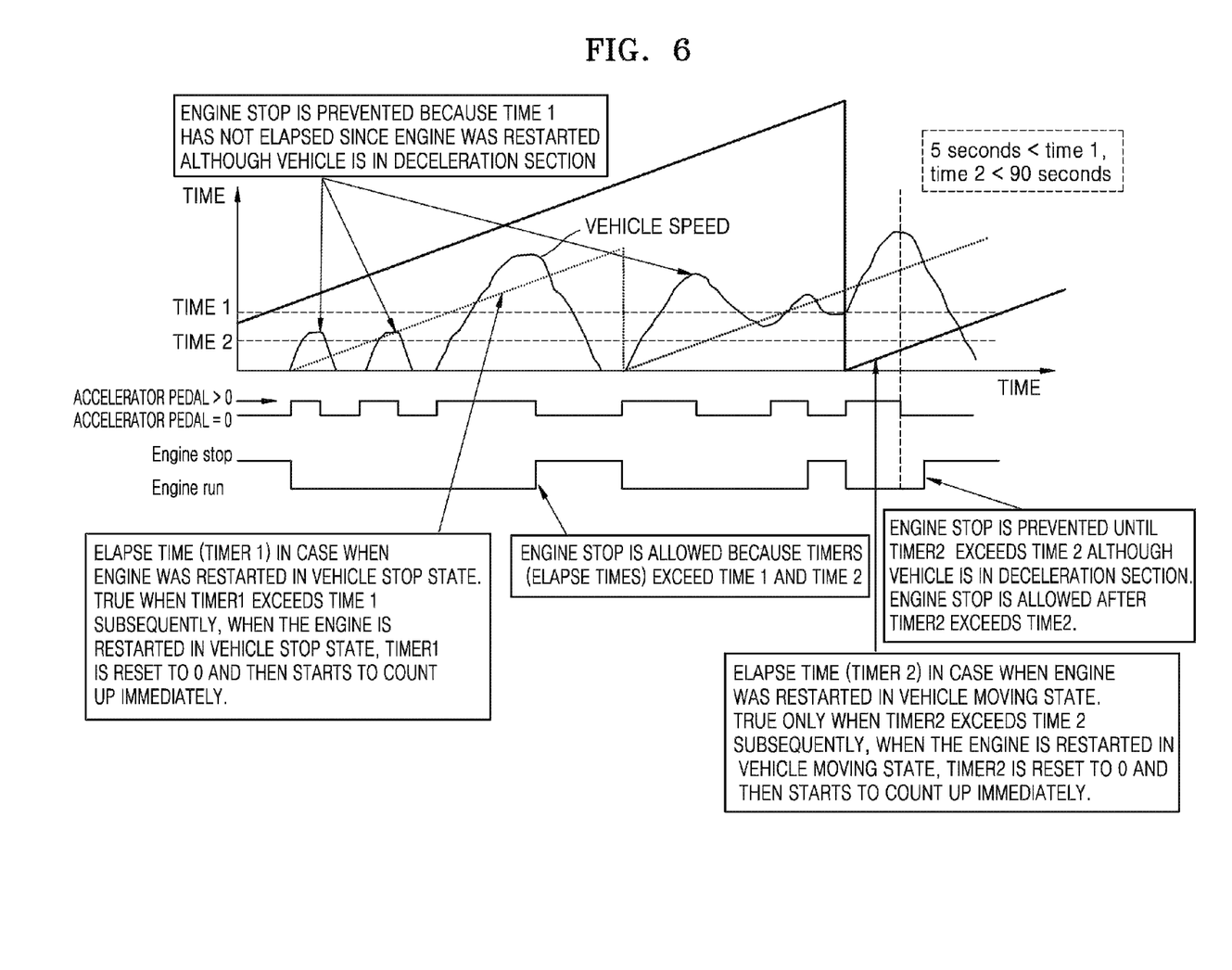
FIG. 6 is a view illustrating a time condition among engine stop resumption conditions in an intelligent ISG control method according to an embodiment of the present invention.

An engine stop resumption condition will be described below with reference to FIGS. 5 and 6.

When the engine is frequently stopped, a driver may have a complaint. Thus the engine stop may be achieved only when engine stop resumption conditions (S1207 and S1208) are satisfied.

The engine stop resumption condition (S1207) associated with the vehicle speed will be described with reference to FIG. 5.

On a section where traffic is heavy, acceleration and deceleration are frequently repeated at a low vehicle speed. In this case, engine stop initiation and engine stop release (restart) may be frequently repeated, thus causing a driver to have a complaint. Accordingly, in order to prevent frequent engine stop, in a case where the engine is restarted in a vehicle stop state, a next engine stop may be allowed only when the vehicle is moving at a speed equal to or greater than constant 3 (selected between 10 kph and 50 kph). In addition, in a case where the engine is restarted in a vehicle moving state, the next engine stop may be initiated only when the vehicle is moving at a vehicle speed higher than constant 2 (selected between 30 kph and 100 kph) or at a vehicle speed lower than constant 1 (selected between 1 kph and 15 kph) which is very small (S1207).

Next, the engine stop resumption condition (S1208) associated with time will be described with reference to FIG. 6. This is also a method for preventing the engine from being frequently stopped and restarted. First, in a case where the engine is restarted in a vehicle stop state, the time is counted up from the restart of the engine, and another engine stop is allowed when time 1 (8 seconds to 30 seconds) elapses. Next, in a case where the engine is restarted in a vehicle moving state, the time is counted up from the restart of the engine, and a next engine stop is allowed when time 2 (8 seconds to 60 seconds) elapses (S1208).

When all the above-described engine stop conditions are achieved, the engine may be stopped (S1215, S1400) after a delay of constant time z (0.3 seconds to 3 seconds) (S1214) according to use conditions. This is intended to block a momentary noise in each sensor value and minimize deceleration shock caused by a sudden stop.

Figure 4:
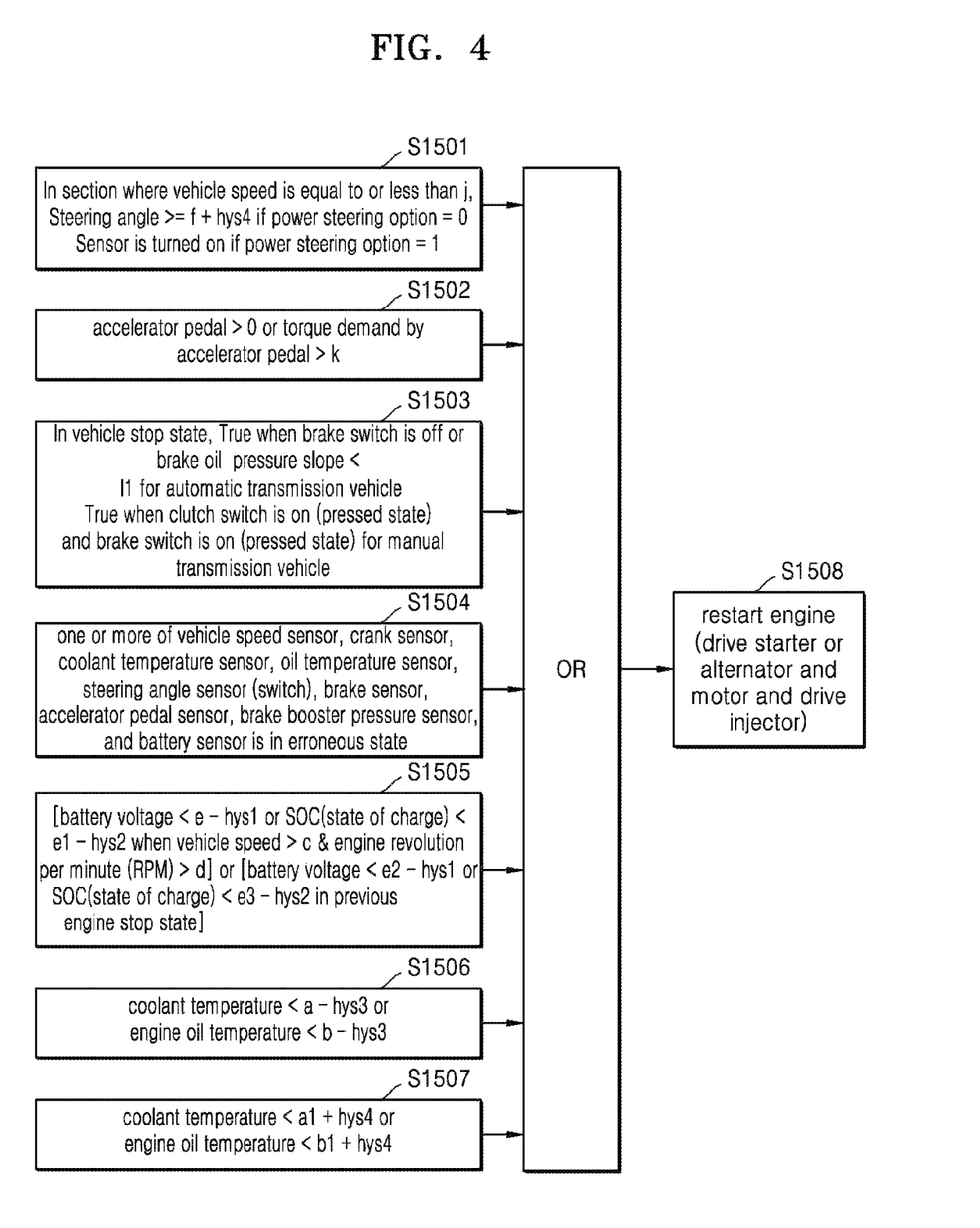
FIG. 4 is a view illustrating an engine stop release condition in an intelligent ISG control method according to an embodiment of the present invention.

Next, the engine stop resumption condition (S1208) associated with time will be described with reference to FIG. 4.

In a case where an engine is stopped by the intelligent ISG control method according to an embodiment, the engine stop release condition (restart) is achieved when any one of a plurality of conditions to be described below is achieved.

In general, when the engine is stopped in a low-speed section, the wheel may feel heavy. This situation may occur in a narrow alleyway and cause steering to be difficult, resulting in an accident. Accordingly, in a case where the vehicle speed is lower than constant j (30 kph to 70 kph), when a steering angle is greater than a certain value (constant f+hys4; constant f refers to the above-described value, and hys4 is 5° to 10°) or a steering switch is turned on (this means a power steering operation) while the engine is stopped, the engine stop release condition is achieved to restart the engine (S1501).

A response a driver desires may be secured only when the engine is restarted after the driver's intention is determined in an engine stop state. Accordingly, the engine stop release condition may be achieved by movements of the accelerator pedal (S1502) and the brake pedal (S1503). When the driver presses the accelerator pedal or a required torque caused by acceleration is equal to or greater than constant k (−50 Nm to 0 Nm) (S1502), the engine may be restarted immediately. In addition, for an automatic transmission vehicle, in a case where the brake pedal is released, for example, the brake pedal is turned off (a state in which a foot is off of the pedal) or the brake pressure decreases (S1503), when a brake pressure variation is less than constant I (−10 bar/sec to 0.5 bar/sec), the engine stop release condition is satisfied. For a manual transmission vehicle, in a case where a clutch switch is turned on (a state in which a clutch pedal is pressed) and a brake switch is turned on (a state in which a brake pedal is pressed), the engine stop release condition is achieved to perform restart (S1507).

In a process of determining the engine stop release condition (S1500), when a failure occurs in any one of sensors such as a vehicle speed sensor, a crank sensor, a coolant temperature sensor, an engine oil sensor, a steering angle sensor (or switch), a brake pedal sensor, an accelerator pedal sensor, a brake booster pressure sensor, and a battery sensor (S1504), the restart (S1507) is immediately performed (S1507). The number of sensors may increase or decrease depending on a specification of the vehicle.

In a process of determining the engine stop condition (S1200), a state of the battery may become poor because the engine is stopped for a long time although a battery condition is satisfied. Since this causes a problem with starting, even while the engine is stopped, a voltage or a state of charge (SOC) of the battery is checked, and the restart (S1507) is performed according to the condition (S1505) of FIG. 4. In this case, the same constant as the one used for the engine stop condition, from which only a hysteresis (hys) value is excluded, is used as a determination value. Here, hys values may be selected from 1V<hys1<0.5V and 1%<hys2<5%.

In addition, when the engine remains stopped in a cold region for a long time, a temperature of the vehicle may decrease and then the vehicle may return to a state before warming-up. In this case, the restart (S1507) may be performed for the same reason as a warming-up (hys3 is selected among 1 to 5).

Effects of the ISG system technique in the related art and the intelligent ISG control device and control method thereof according to an embodiment will be described.

In FTP-75 mode, which is Korea fuel efficiency authentication mode, a fuel portion in an idle state is about 8%, and a fuel portion in a deceleration section is also about 8%. FTP-75 mode, which is Korea fuel efficiency authentication mode, a fuel portion in an idle state is about 8%, and a fuel portion in a deceleration section is also about 8%. However, in the ISG technique in the related art, in consideration of a fuel loss caused by keeping the engine running for 1 to 2 seconds after a vehicle exits a driving mode in order to check whether a vehicle speed becomes zero, a fuel loss caused by releasing engine stop when the brake is released for 1 to 2 seconds before the vehicle enters the driving mode in order to secure an engine response, a fuel loss caused by prevention of engine stop for the first about 20 seconds in an idle section in order to activate a catalyst, a fuel loss caused by an amount of fuel required for start-up being 1.5 times as great as an amount of fuel for the idle section, and so on, an actual saved idle fuel portion is just 2% to 4% although a total idle fuel portion is 8%. However, the intelligent ISG control device and the control method thereof according to an embodiment disclosed herein may save fuel consumption by 8% to 12% for a gasoline automatic transmission vehicle in FTP-75 mode by stopping the engine from a deceleration section to a stop section, compared to the related-art ISG system applied only when the vehicle is stopped.

The intelligent ISG control device and the control method thereof according to an embodiment can also maximize improvement of fuel efficiency while minimizing an increase in cost for a system because a voltage of the system is not needed to be changed in order to apply the ISG system to a vehicle with a 12V system (for example, a vehicle with a 24V system or 36V system). In addition, the intelligent ISG control device and the control method thereof according to an embodiment of the present invention may be applied to vehicles with a 12V system, commercial vehicles, and heavy-duty commercial vehicles with a 24V system.

As described above, according to the one or more of the above example embodiments, for a commercial or passenger car with a 12V system and a heavy-duty commercial vehicle with a 24V system, the intelligent ISG control device and the control method thereof can maximize improvement of fuel efficiency from 2-4% to 8-12% for a gasoline automatic transmission vehicle in FTP-75 mode by stopping the engine from a deceleration section to a stop section, compared to the related-art ISG system applied only when the vehicle is stopped.

It should be understood that the example embodiments described therein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. An intelligent idle stop and go (ISG) control device for a vehicle, the intelligent ISG control device comprising:
   a signal detection unit configured to detect a plurality of signals comprising
   a signal indicating an engine revolution per minute (RPM) of the vehicle,
   a signal indicating a vehicle speed of the vehicle,
   a signal indicating a phase or variation in phase of an accelerator pedal of the vehicle, and
   a signal indicating manipulation of a brake pedal of the vehicle,
   and
   an ISG control unit configured to determine:
   whether an engine stop condition of the vehicle is satisfied; and
   whether an engine stop release condition of the vehicle is satisfied based on at least one signal of the plurality of signals detected by the signal detection unit,
   wherein the ISG control unit turns off an injector of an engine to stop the engine when the engine stop condition is satisfied,
   wherein the ISG control unit does not stop the engine when a predetermined first time has not elapsed since the engine was restarted in a vehicle moving state although the engine stop condition is satisfied.

2. The intelligent ISG control device of claim 1, wherein the ISG control unit does not stop the engine when a predetermined third time has not elapsed with the entire engine stop condition being satisfied.

3. The intelligent ISG control device of claim 1, wherein the ISG control unit is configured to release the engine stop when the accelerator pedal is on (a pressed state) or the brake pedal is off (a released state) in a condition that the engine stop condition is satisfied to stop the engine.

4. The intelligent ISG control device of claim 1, wherein:
   the plurality of signals further comprising a signal indicating a voltage or a state of charge of a battery of the vehicle, a signal indicating a coolant temperature of the vehicle, a signal indicating a steering angle or actuation of a power steering of the vehicle, and a signal indicating a brake booster pressure of the vehicle.

5. The intelligent ISG control device of claim 4, wherein:
   the signal detection unit is configured to detect a signal indicating an engine oil temperature of the engine of the vehicle, and
   the ISG control unit is configured to turn on the injector to release the engine stop when at least one of the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed does not satisfy the engine stop condition.

6. The intelligent ISG control device of claim 4, wherein the ISG control unit allows the engine stop to be initiated only when a brake of the vehicle is on through manipulation of the brake pedal in a vehicle moving state.

7. An intelligent idle stop and go (ISG) control device for a vehicle, the intelligent ISG control device comprising:
   a signal detection unit configured to detect a plurality of signals comprising
   a signal indicating an engine revolution per minute (RPM) of the vehicle,
   a signal indicating a vehicle speed of the vehicle,
   a signal indicating a phase or variation in phase of an accelerator pedal of the vehicle, and
   a signal indicating manipulation of a brake pedal of the vehicle,
   and
   an ISG control unit configured to determine:
   whether an engine stop condition of the vehicle is satisfied; and
   whether an engine stop release condition of the vehicle is satisfied based on at least one signal of the plurality of signals detected by the signal detection unit,
   wherein the ISG control unit turns off an injector of an engine to stop the engine when the engine stop condition is satisfied,
   wherein the ISG control unit does not stop the engine when the vehicle speed has never been outside a predetermined range since the engine was restarted in a vehicle moving state although the engine stop condition is satisfied.

8. The intelligent ISG control device of claim 7, wherein the ISG control unit does not stop the engine when a predetermined second time has not elapsed since the engine was restarted in a vehicle stop state although the engine stop condition is satisfied.

9. The intelligent ISG control device of claim 7, wherein the ISG control unit does not stop the engine when the vehicle speed has not exceeded a predetermined first reference vehicle speed since the engine was restarted in a vehicle stop state although the engine stop condition is satisfied.

10. The intelligent ISG control device of claim 7, wherein:
    the plurality of signals further comprising a signal indicating a voltage or a state of charge of a battery of the vehicle, a signal indicating a coolant temperature of the vehicle, a signal indicating a steering angle or actuation of a power steering of the vehicle, and a signal indicating a brake booster pressure of the vehicle.

11. The intelligent ISG control device of claim 10, wherein:
    the signal detection unit is configured to detect a signal indicating an engine oil temperature of the engine of the vehicle, and the ISG control unit is configured to detect the engine stop condition based on the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed.

12. The intelligent ISG control device of claim 10, wherein:
the signal detection unit is configured to detect a signal indicating an engine oil temperature of the engine of the vehicle, and
the ISG control unit is configured to turn on the injector to release the engine stop when at least one of the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed does not satisfy the engine stop condition.

13. An intelligent idle stop and go (ISG) control device for a vehicle, the intelligent ISG control device comprising:
a signal detection unit configured to detect a plurality of signals comprising
a signal indicating an engine revolution per minute (RPM) of the vehicle,
a signal indicating a vehicle speed of the vehicle,
a signal indicating a phase or variation in phase of an accelerator pedal of the vehicle, and
a signal indicating manipulation of a brake pedal of the vehicle,
and
an ISG control unit configured to determine:
whether an engine stop condition of the vehicle is satisfied; and
whether an engine stop release condition of the vehicle is satisfied based on at least one signal of the plurality of signals detected by the signal detection unit,
wherein the ISG control unit turns off an injector of an engine to stop the engine when the engine stop condition is satisfied,
the vehicle comprises an automatic transmission, and the ISG control unit allows the engine stop to be initiated depending on whether or not the automatic transmission is locked up in a vehicle deceleration state.

14. The intelligent ISG control device of claim 13, wherein the ISG control unit is configured to determine whether the engine stop is initiated, in linkage with a fuel cut condition in a vehicle deceleration state.

15. The intelligent ISG control device of claim 13, wherein the ISG control unit is configured to turn off the injector of the engine until the engine stop release condition is satisfied, when the engine stop condition is satisfied although a fuel cut release condition is achieved in a vehicle deceleration state.

16. The intelligent ISG control device of claim 13, wherein the ISG control unit does not stop the engine when an absolute value of a variation in deceleration of the vehicle speed of the vehicle is greater than a predetermined deceleration reference value.

17. The intelligent ISG control device of claim 13, wherein:
the plurality of signals further comprising a signal indicating a voltage or a state of charge of a battery of the vehicle, a signal indicating a coolant temperature of the vehicle, a signal indicating a steering angle or actuation of a power steering of the vehicle, and a signal indicating a brake booster pressure of the vehicle.

18. The intelligent ISG control device of claim 17, wherein:
the signal detection unit is configured to detect a signal indicating an engine oil temperature of the engine of the vehicle, and
the ISG control unit is configured to detect the engine stop condition based on the signal indicating the coolant temperature, the signal indicating the engine oil temperature, the signal indicating the steering angle or the actuation of the power steering, the signal indicating the brake booster pressure, the signal indicating the phase or the variation in the phase of the accelerator pedal, the signal indicating the voltage or the state of charge of the battery, and the signal indicating the vehicle speed.

19. The intelligent ISG control device of claim 17, wherein the ISG control unit is configured to determine the engine stop condition and the engine stop release condition depending on whether or not an electronic power steering is applied to the vehicle, whether or not a power steering angle sensor or switch is applied to the vehicle, or whether or not a brake booster pressure sensor is applied to the vehicle.

20. The intelligent ISG control device of claim 17, wherein the ISG control unit is configured to determine whether the engine stop condition is achieved based on a required torque value generated based on a torque-based control of the engine instead of the signal indicating the phase or the variation in the phase of the accelerator pedal.

* * * * *